(12) United States Patent
Wendt et al.

(10) Patent No.: US 7,203,278 B2
(45) Date of Patent: Apr. 10, 2007

(54) RADIOGRAPHY PLATE WITH AUTOMATIC EXPOSURE TIME RECORDING MECHANISM

(75) Inventors: Gary J. Wendt, Middleton, WI (US); Walter W. Peppler, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 271 days.

(21) Appl. No.: 10/811,440

(22) Filed: Mar. 26, 2004

(65) Prior Publication Data

US 2005/0211907 A1 Sep. 29, 2005

(51) Int. Cl.
G01B 15/02 (2006.01)
H05G 1/44 (2006.01)
G01T 1/02 (2006.01)

(52) U.S. Cl. ............... 378/98.8; 378/108; 250/370.07
(58) Field of Classification Search ............ 378/98.8, 378/162, 165–176, 181–184; 250/370.09, 250/580, 591, 390.02, 370.07
See application file for complete search history.

(56) References Cited

U.S. PATENT DOCUMENTS

| 4,082,953 A * | 4/1978 | Krause et al. ............... 378/97 |
| 4,546,251 A * | 10/1985 | Schaffer ............... 250/252.1 |
| 5,195,122 A | 3/1993 | Fabian |
| 5,237,601 A | 8/1993 | Boutet et al. |
| 5,282,236 A * | 1/1994 | Hayes et al. ............... 378/182 |
| 5,418,355 A | 5/1995 | Weil |
| 6,151,382 A * | 11/2000 | Gilblom ............... 378/98.8 |
| 2003/0125616 A1* | 7/2003 | Black et al. ............... 600/407 |

FOREIGN PATENT DOCUMENTS

| JP | 01 309044 A | 12/1989 |
| JP | 01309044 A2 * | 12/1989 |
| JP | 08 152477 A | 6/1996 |

* cited by examiner

Primary Examiner—Edward J. Glick
Assistant Examiner—Irakli Kiknadze
(74) Attorney, Agent, or Firm—Boyle Fredrickson Newholm Stein & Gratz S.C.

(57) ABSTRACT

A radiation exposure recording device and radiography method are disclosed, where the radiation exposure recording device includes a radiation exposure recording medium, a housing that at least partly surrounds the radiation exposure recording medium, and a first detector that detects a radiation exposure. An output signal produced in response to the detecting of the radiation exposure can be provided, and the detection of and output of a signal in response to the radiation exposure is entirely automatic and independent of any manual processing of the radiation exposure recording device. Further, the radiography method includes providing a first radiation exposure recording medium, providing a first radiation exposure detector, and sensing an exposure of radiation at the first radiation exposure detector. Also disclosed is a circuit that can be retrofitted to existing radiography cassettes for detecting when the cassettes are exposed to radiation.

13 Claims, 4 Drawing Sheets

RADIOGRAPHY PLATE WITH AUTOMATIC EXPOSURE TIME RECORDING MECHANISM

STATEMENT REGARDING FEDERALLY SPONSORED RESEARCH OR DEVELOPMENT

This invention was made with United States Government support awarded by the following agencies: ARMY/MRMC DAMD17-02-1-0517. The United States Government has certain rights in this invention.

CROSS-REFERENCE TO RELATED APPLICATIONS

BACKGROUND OF THE INVENTION

The present invention relates to x-ray radiography and, in particular, to the using of radiography plates to record x-ray information.

X-ray radiographs are of great value in diagnosing patient illnesses and monitoring patient status. A variety of x-ray radiographic techniques are now available including, for example, computed tomography (CT) and more conventional x-ray techniques. Radiographs or "radiographic pictures" are commonly taken by way of radiography plates that temporarily or, in some circumstances, permanently record radiographic information. Such radiography plates commonly come in two forms. A first form employs a version of photographic film, which typically is a sheet of translucent supporting material that is coated on one or both of its sides by a photosensitive emulsion. When exposed to photons at the wavelengths of interest, the photosensitive emulsion darkens the film at various locations according to the amounts of exposure that have occurred at any given location.

A second form of radiography plate employs a photostimulable phosphor plate. When exposed to x-ray photons from a radiography machine, energy is stored in the sheet at different positions according to the intensity of the radiation exposure at those positions, and thus the sheet stores an image. Then, some time later after the exposure to the high energy radiation, the sheet is "read" by a machine that scans the sheet with a small area beam (e.g., a laser beam) of relatively long-wavelength radiation to release the energy stored in the sheet as light. An appropriate photosensor receives light that is emitted by the sheet and produces electrical signals in accordance with the light received. The electrical energy in turn can be digitized to store the image information for computer access, or to output that image information on a display device or the like.

In each of these cases, although the radiography plates are intended for sensing x-ray photons such as those produced by radiography machines, the plates nevertheless are also sensitive to other light, in that the light would serve to erase the previously stored information. Consequently, to prevent the exposure of the radiography plates to visible light until such time as the radiographic information on those plates can be processed and recorded on a less ephemeral form, the plates typically are housed within boxes or "cassettes" that are impervious to visible light despite allowing for the passage of the high energy radiation produced by the radiographic imaging machines. When a radiograph exposure is taken, the cassette is removed for processing of the plate in the cassette. In the case of traditional photographic film-type radiography plates, the radiographic images are not in a stable form until the film is processed in a conventional manner in a "dark room". Similarly, in the case of machine-read radiography plates, the cassettes are designed to be inserted into a cassette-reading machine, which is able to remove the radiographic plates from the cassettes and then read the information on those plates.

Although cassette-reading machines are able to "automatically" read the radiographic information stored on machine-read radiography plates, there nevertheless can be considerable delay in the processing of such plates by the cassette-reading machines. Likewise, there can be considerable delay in the processing of photographic film-type radiography plates by film-development equipment. These delays are attributable to the fact that radiography plates are seldom processed, either by cassette-reading machines or by film-development equipment, immediately subsequent to the radiograph exposures. Rather, there tends to be a time gap between the times at which the radiograph exposures occur and the times at which the radiography plates are processed.

A primary reason for this time gap is that radiography machines typically are not physically located proximate the cassette-reading machine or film-development machine at which cassettes are processed. This is due in part to the desirability of using portable radiography machines that can be brought to a patient's location. As a result, when radiographs are taken, the cassettes typically need to be hand-delivered back to the cassette-reading machine or film-development machine for processing, which can take a significant and variable amount of time depending upon the person delivering the cassette. A second reason for the time gap between radiograph exposures and the processing of radiography plates is that radiographic images are often acquired in batches by the technicians who perform the radiographic tests. That is, numerous tests on multiple patients, sometimes situated in different medical units (e.g., Trauma, Intensive Care, Burn, etc.), are often performed by a technician over the course of several hours before a batch of radiographic plates is turned in by the technician for processing.

Despite the existence of these delays, the typical protocol for assigning imaging times to radiography plates indicating the times at which the plates were exposed to x-ray radiation during radiographic procedures is simply to assign the times at which the plates are being processed as the times at which the radiographs were taken. In the case of machine-read radiography plates, in particular, cassette-reading machines typically assign the times at which they process cassettes as the times at which the radiographic information was obtained. Likewise, in the case of photographic film-type radiography plates, typically it is the times at which the plates are processed by film-development equipment that are assigned as the images as the exposure times.

While the times at which radiography plates are processed is often an adequate proxy for the times at which radiographic images were taken, this is not always the case. The existence of these differences between the times at which radiography tests are performed and the times that are assigned to the images resulting from those tests can become particularly disadvantageous in circumstances where a given patient is undergoing relatively rapid changes, or where a given patient is undergoing repeated radiography tests in a relatively short amount of time. In such circumstances, it can become particularly important for physicians and others to understand the exact times at which images have been taken, to understand the rapidity of changes that are occurring in a patient. Further, it is particularly important in such circumstances that the proper order in which different images have been taken be readily apparent to a physician or other personnel reviewing the images. Yet the conventional manner of assigning times to radiography images can make it difficult or impossible for physicians and others to understand the temporal relationships among different radiography images.

Indeed, in some circumstances, the conventional manner of assigning times to radiography images can cause a misinterpretation of the different images and consequently cause a misunderstanding of a patient's condition. For example, if a patient's condition suddenly begins to deteriorate, a STAT film may be requested by a physician and nearly immediately a technician may proceed with performing a radiographic test and have the radiography plates processed. If, prior to the change in the patient's condition, an earlier set of radiographic tests were performed and the processing of the resulting radiography plates has not yet been completed, it is possible that the earlier-obtained radiography images may be assigned later times than the rushed images. A physician reviewing the entire set of processed images, then, may be presented with images that misrepresent the overall progress of a patient's condition.

It therefore would be advantageous if a new radiographic device and/or technique was developed that allowed times to be assigned to radiographic images that more accurately reflected the actual times at which the radiographic tests that produced the images were performed. It further would be advantageous if such a new radiographic device and/or technique could be easily and inexpensively implemented in relation to radiographic images obtained using both film-type and machine-read radiography plates. Further, insofar as conventional radiography plates are relatively expensive devices, it would be advantageous if such a new radiographic device and/or technique could be easily and inexpensively applied to existing radiography plates.

SUMMARY OF THE INVENTION

The present inventors have recognized that the problems associated with ascribing the proper times to radiographic images could be eliminated if the radiography cassettes themselves included circuits that automatically recorded when the radiography cassettes were exposed to radiation during radiography tests. With such circuits embedded within or fixedly attached to the cassette housings, or fixedly attached to the radiography plates within the cassette housings, the ascribing of times to the radiographic images would be independent of the times at which the radiography plates were processed, either in a dark room or by way of a cassette-reading machine, and instead truly be reflective of the times of radiation exposure. In particular, the present invention relates to a radiation exposure recording device that includes a radiation exposure recording medium, a housing that at least partly surrounds the radiation exposure recording medium, and a first detector that detects a first radiation exposure and produces at least one signal in response to detecting the first radiation exposure.

Further, the present invention relates to a radiation exposure detection device for implementation on a radiography cassette. The detection device includes a radiation-sensitive component that provides a signal upon being exposed to radiation, and a mechanism capable of attaching the radiation-sensitive component to the radiography cassette.

Additionally, the present invention relates to a radiography method that includes providing a first radiation exposure recording medium, providing a first radiation exposure detector, and sensing an exposure of radiation at the first radiation exposure detector.

These particular objects and advantages may apply to only some embodiments falling within the claims and thus do not define the scope of the invention.

DETAILED DESCRIPTION OF THE PREFERRED EMBODIMENT

Figure 1:
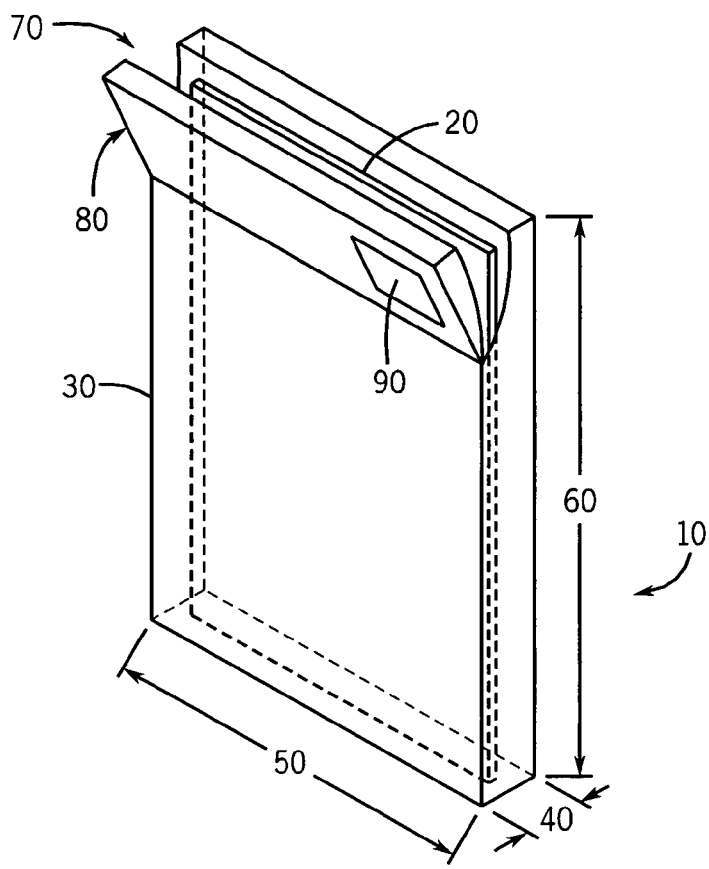
FIG. 1 is a perspective view of an exemplary Prior Art radiography cassette.

Referring to FIG. 1, an exemplary prior art radiography cassette 10 is shown to include a radiography plate 20 and a cassette housing 30. The cassette housing 30 is typically made from plastic or some other material that blocks the transmission of visible light yet is essentially transparent with respect to radiation of wavelengths that are commonly employed by radiographic machines (e.g., x-rays). Commonly, the cassette housing 30 and the radiography plate 20 are generally rectangular and the cassette housing, which is intended to entirely (or at least substantially) contain the radiography plate, has a thickness 40 that is substantially less than its width 50 or height 60. The radiography plate 20 is capable of being inserted and removed from the cassette housing 30 by way of an opening 70 that can be formed when a hinged door portion 80 of the cassette housing 30 is swung open. In the embodiment shown, the hinged door portion 80 of the cassette housing 30 additionally has a small window 90 on one of its surfaces, which allows certain information that is printed on the radiography plate 20 to be visible to someone even when the hinged door portion 80 is closed such that the radiography plate is fully contained within the cassette housing. It is known for such information printed on the radiography plate 20 to include a serial number of the radiography plate, in particular.

Figure 2:
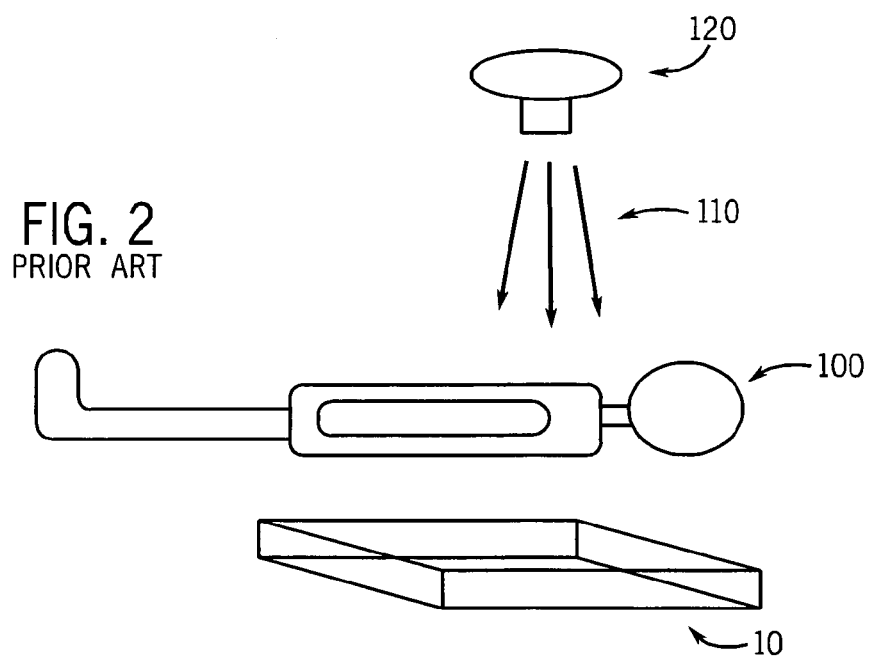
FIG. 2 is a schematic view of a radiography machine taking a radiograph of a patient using the radiography cassette of FIG. 1.

Turning to FIG. 2, as is known in the prior art, the radiography cassette 10 can be utilized to take radiographs (that is, radiographic pictures) of portions of a patient 100 when the patient is exposed to radiation 110 emitted by a radiation source 120. Although not shown in detail, FIG. 2 is intended to be representative of a variety of radiography machines that generally employ a radiation source and a radiography cassette including, for example, various x-ray machines, computed tomography ("CT") machines, and other radiography machines. As discussed in the Background of the Invention above, the radiography plate 20 within the cassette housing 30 generally can be one of two types. A first type of radiography plate 20 is essentially a sheet of photographic film that, after being exposed to radiation, must be processed by a technician in a dark room or similar film development environment using known film-developing machines and processes. A second type of radiography plate 20 employs a sheet that records radiation exposure and, after radiation exposure has occurred, is capable of being read by a cassette-reading machine (not shown). As discussed above, the reading of the sheet typically occurs by scanning the sheet with a small area beam to release the energy stored in the sheet as light, sensing the emitted light, and generating electrical signals in response to the light, where the electrical signals can then be digitized, stored and/or output.

Figure 3:
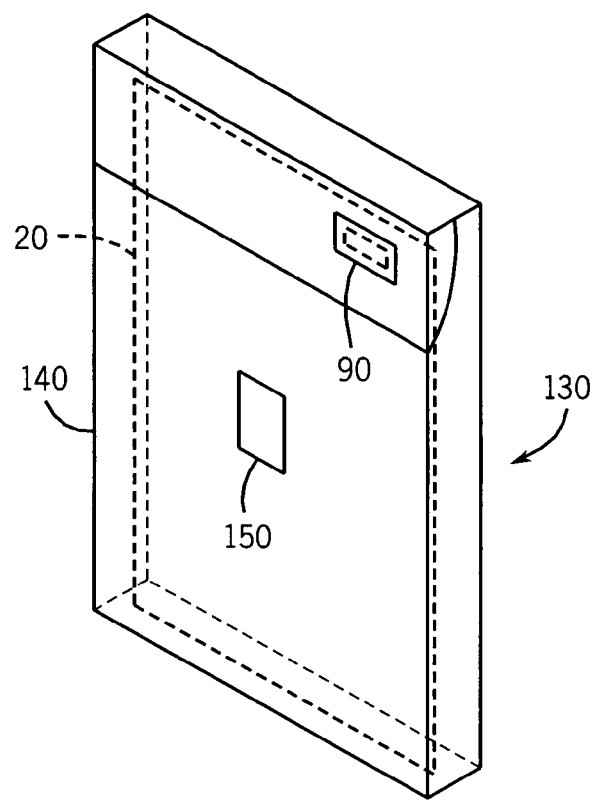
FIG. 3 is a perspective view of an exemplary radiography cassette in accordance with one embodiment of the present invention.

Turning to FIG. 3, in accordance with a first embodiment of the present invention, an improved cassette 130, in addition to housing the radiography plate 20 and having the window 90 by which information printed on the radiography plate is visible from outside the cassette, has an improved cassette housing 140 that in particular includes a specialized sensing circuit 150. The circuit 150 is sensitive to radiation at the levels produced by a radiation source of a radiography machine (such as the source 120 of FIG. 2) and, in response to sensing the occurrence of such radiation, is capable of providing an indication or output signal that such radiation has occurred. Depending upon the embodiment, the circuit 150 is capable of sensing various attributes including, for example, sensing that a radiation exposure has occurred, sensing that a radiation exposure at or above a particular threshold magnitude has occurred, and/or sensing an accumulated amount of radiation exposure that has occurred thus far since a starting time.

The signal(s) output by the circuit 150 also can vary depending upon the embodiment. For example, in a preferred embodiment, and as discussed in further detail with reference to FIG. 4, the circuit 150 not only detects that a radiation exposure has occurred, but also determines and indicates (and/or stores) the time of the radiation exposure. Also for example, in other embodiments, the signal(s) output by the circuit 150 are capable of indicating a total accumulated magnitude of radiation exposure that has occurred thus far, and/or capable of causing the radiation source 120 to modify or stop the emitted radiation or modify some other aspect of the radiation treatment. In such embodiments, the signals output by the circuit 150 can be simply indicative of the accumulated magnitude of radiation exposure that has occurred, to allow the radiation source 120 or related device to determine what action to take based upon that information, or alternately can be signals that directly cause the radiation source 120 to modify or stop emitting radiation (or otherwise modify some aspect of the radiation treatment process), in which case the circuit 150 operates as a phototimer.

The output(s) of the circuit 150 in its various forms can be provided, depending upon the embodiment, in digital or analog form. Also, the circuit 150 can be implemented using any of a variety of known hardware and/or software technologies including, for example, through the use of one or more microprocessors, application-specific integrated circuits (ASIC), discrete circuit components and/or software implemented on a microcomputer/microprocessor or other computing device.

Figure 4:
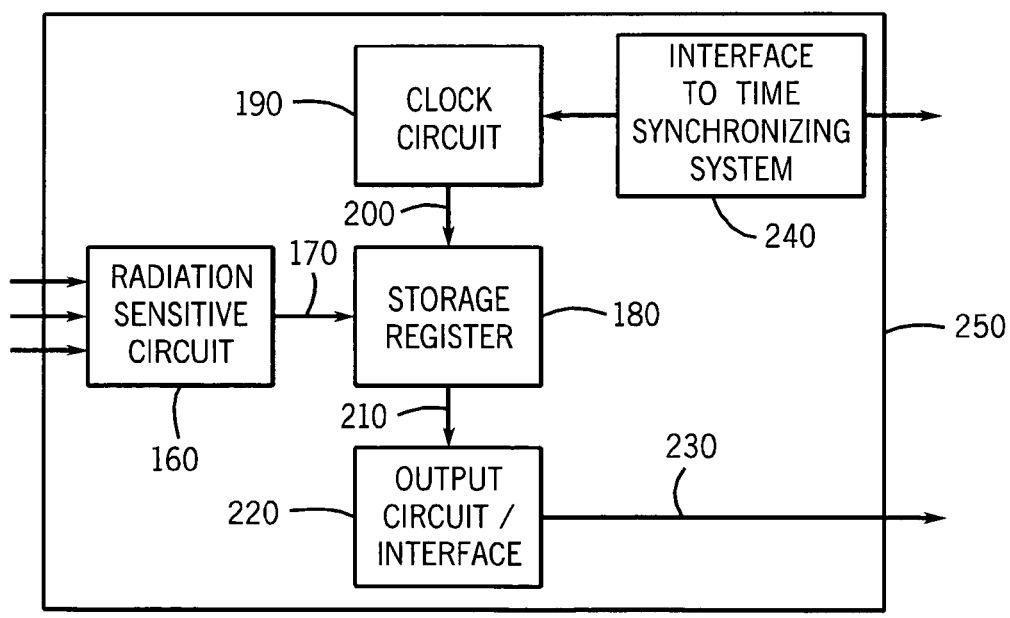
FIG. 4. is a block diagram showing exemplary components of a circuit employed in the radiography cassette of FIG. 3.

Referring to FIG. 4, a preferred embodiment of the circuit 150, shown as a circuit 250, includes several components. Specifically, a radiation sensitive circuit 160, which detects radiation exposure, provides a signal 170 that is indicative that radiation exposure has occurred to a storage register 180 that also is coupled to a clock circuit 190 that provides clock signals 200 to the storage register. The storage register 180, upon receiving the signal 170 from the radiation sensitive circuit 160, stores a time at which a radiation exposure has occurred based upon the signals from the clock circuit 200. This information in turn can be sent by way of a further signal 210 to an output circuit (or interface) 220 that is capable of further providing an output signal 230 to another location or device. Further as shown, in at least one embodiment, the clock circuit 190 is further coupled to an interface to time synchronizing system 240, by which the clock circuit 190 is able to communicate with a reference and thereby verify that the time information that it is providing by way of the clock signals 200 is correct. The circuit 250 further can be powered by way of a battery (not shown) and/or by way of a power line coupled to the circuit or the radiography cassette (in certain embodiments, the battery can be recharged by power from a power line when such power line is intermittently connected).

The circuit 250, and specifically the radiation sensitive circuit 160, can in certain embodiments be "one-shot" devices that are only capable of detecting a single exposure of the radiography cassette to radiation, and thereafter incapable of detecting any further exposures. In such embodiments, the storage register 180 only stores a single time corresponding to the single time of exposure as indicated by the signal 170, and the output circuit 230 only indicates a single time of exposure. In other embodiments, the circuit 250 is capable of detecting later radiation exposure(s) subsequent to detecting a first radiation exposure. In some embodiments of this type, the storage register 180 stores times corresponding to each time the storage register receives the signal 170 from the radiation-sensitive circuit 160 indicating that an exposure has occurred. In other embodiments of this type, the circuit 250 is resettable and only stores the time of occurrence of a new radiation exposure after it has been reset subsequent to a previous radiation exposure. Such resetting, in certain embodiments, can be manually triggered (e.g., by way of a button, not shown) or triggered by the cassette-reading machine during the cassette reading process, or occur automatically after a certain period of time has elapsed subsequent to a previous radiation exposure.

While the present invention is generally intended to encompass any of a variety of different radiography cassettes that employ, in addition to a radiography plate that constitutes the recording medium, an additional sensing device for sensing the exposure of the cassette/plate to radiation and providing an indication or signal as a result thereof, the present invention is particularly advantageous when implemented in a manner that includes the clock circuit 190 or a similar time measuring device. By using such a device, it is possible to provide an accurate indication of when a given radiography test was performed. Further, because the time recording operation is automatic and does not rely upon any human intervention, the time recorded and output by the circuit 250 (or similar circuit employing a time measuring device) is much more reliable as an indication of when a given radiography test was performed than the times ascribed to the radiography tests by technicians or cassette-reading machines after the fact, as is conventionally done.

Although not shown in FIG. 3 or 4 in detail, the output circuit 220 can include any of a variety of different types of circuit components capable of transmitting or outputting signals to other devices. For example, the output circuit 220 can include an RS-232 port or USB port by which the output circuit 220 can be coupled to a complementary port within a cassette-reading machine or to a cable that in turn is coupled to such a machine or to another device (such as a personal computer). Also, in other embodiments, the output circuit 220 can include a wireless transmitter by which information is transmitted using wireless Ethernet, RF transmission or IR transmission techniques, as are known to those of ordinary skill in the art. In other embodiments, the output circuit 220 is a display or audio device, and the output signal 230 is a visual or audio output. The radiation sensitive circuit 160 also can take on a variety of different forms, including, for example, a radiation sensitive photo-emitting diode that produces a light signal as the signal 170 when the radiation sensitive circuit 160 is exposed to radiation during a radiography test. The storage register 180 and clock circuit 190 also can employ any of a variety of conventional devices for storing information and providing timing signals as are known to those of ordinary skill in the art.

Figure 5:
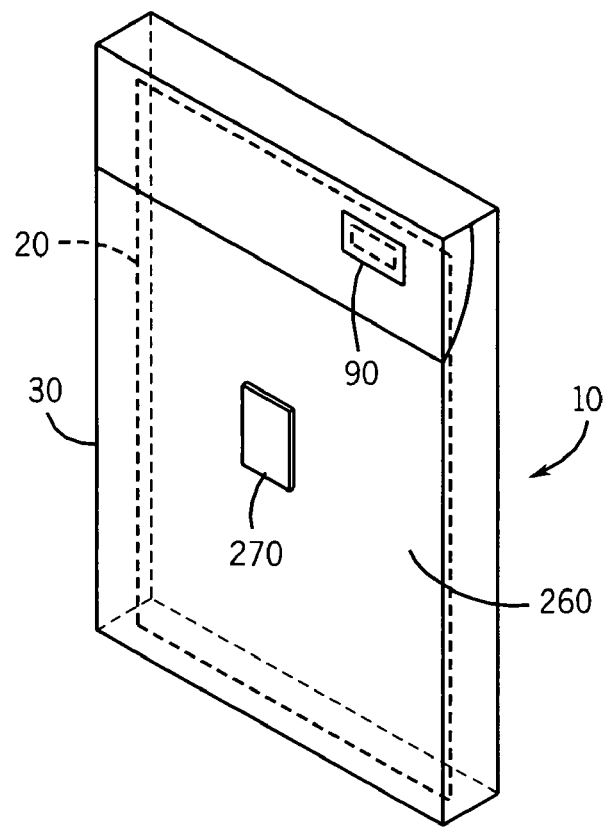
FIG. 5 is a perspective view of an exemplary, modified radiography cassette having a circuit for detecting radiation exposure attached to its outer surface, in accordance with another embodiment of the present invention.

Referring to FIG. 5, in a further embodiment of the present invention, the conventional cassette 10 of FIG. 1 is retrofitted with a form of the circuit 150, shown as a circuit 270, which is attached to an outside surface 260 of the cassette housing 30. In this embodiment, the circuit 270 is capable of taking on any of the structures and features of the circuits 150, 250 and other circuits previously described. However, the circuit 270 is an add-on device that can be attached to the outer surface 260 of the cassette housing 30 by any conventional attachment technique such as, for example, a glue or adhesive substance, or by way of attachment components such as screws, clips, etc. Preferably, once attached, it is difficult to remove the circuit 270 from the cassette housing 30 such that it is unlikely that the circuit 270 will inadvertently fall off of the cassette housing in a manner that might result in confusion as to whether any information stored on the circuit (or other status of the circuit) applied to the particular cassette 10. In the embodiment shown, the circuit 270 is in the shape of a card such that it preferably does not increase the overall thickness of the cassette 10 by any more than a relatively small amount. In other embodiments, the circuit 270 can take on other shapes and sizes.

Figure 6:
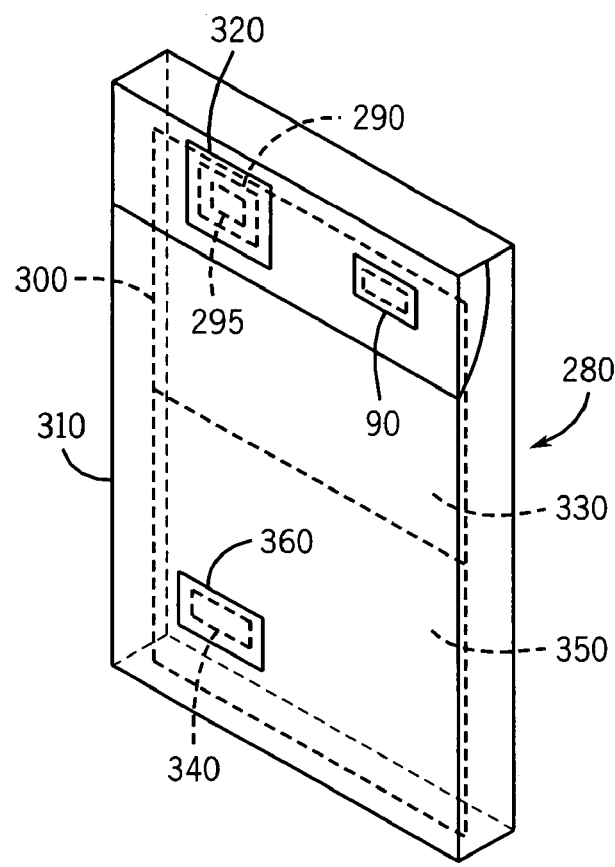
FIG. 6 is a perspective view of an additional exemplary radiography cassette in accordance with a further embodiment of the present invention, where one or more circuits for detecting radiation exposure are attached to a radiography plate within the cassette.

Referring to FIG. 6, a further embodiment of an improved cassette 280 is shown. The cassette 280, in contrast to the cassette 130, employs a special circuit 290 on its radiography plate 300 rather than on a cassette housing 310. Further as shown, in certain embodiments the circuit 290 is able to display information, for example, by way of a liquid crystal display 295. In such embodiments, an additional window 320 can be formed on the cassette housing 310 to allow for inspection of such information displayed on the display 295 from outside the cassette 280. Depending upon the embodiment, the information to be output by the circuit 290 can also be output in other manners as discussed with reference to FIG. 4, for example, by way of wireless transmission or by way of direct electrical coupling. Since the circuit 290 is mounted on or otherwise forms part of the radiography plate 300, direct electrical coupling is possible when the plate 300 is removed from the cassette housing 310 (e.g., removed by a developer in a dark room or automatically by a cassette-reading machine) or, alternately, by way of an internal connection between the radiography plate 300 and the cassette housing 310, which in turn could be directly electrically coupled to another component.

Figure 7:
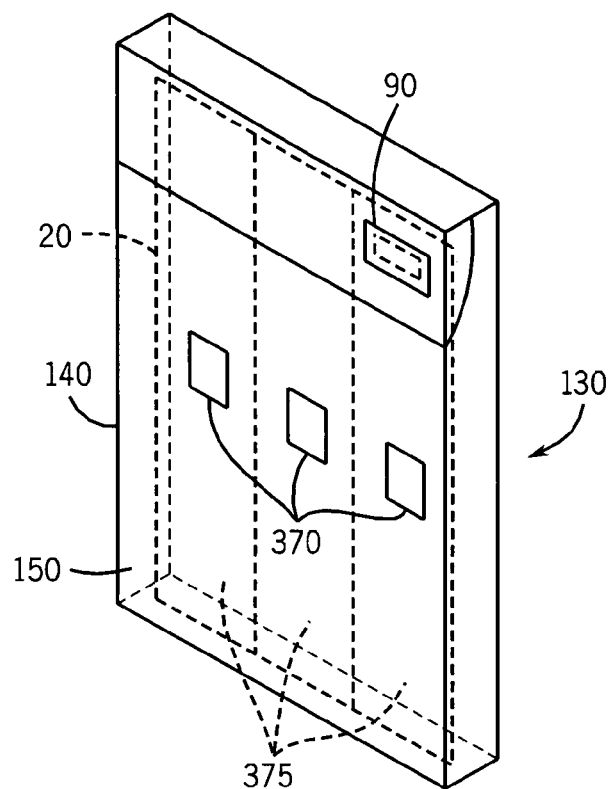
FIGS. 7–8 are additional perspective views showing additional exemplary radiography cassettes in accordance with further embodiments of the present invention.
Figure 8:
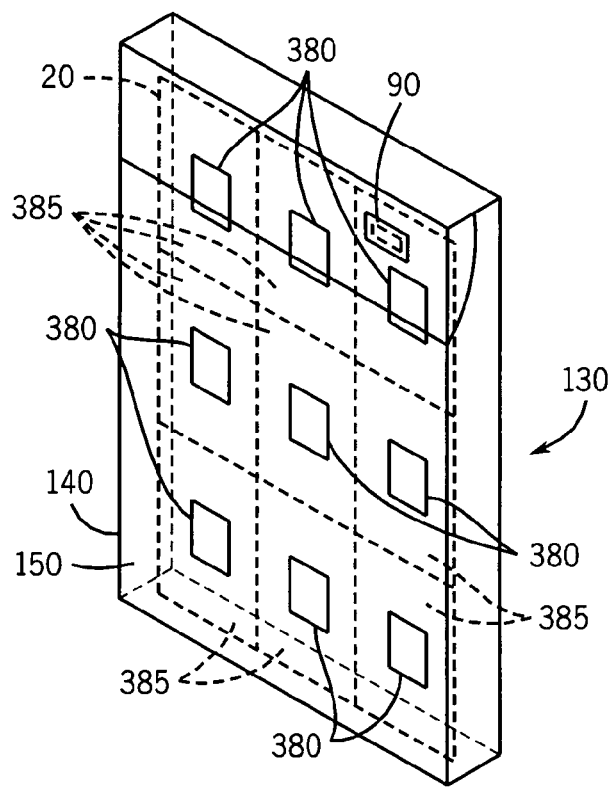

Referring still to FIG. 6 and additionally to FIGS. 7 and 8, in certain embodiments, more than one of the circuits 290 shown in FIG. 6 or the circuits 150, 250, 270 of FIGS. 3–5 (or other circuits serving the same purposes as these circuits) can be mounted at different locations on the cassette 280. In the embodiment shown in FIG. 6 in particular, the circuit 290 serves as an indication of whether a top portion 330 of the cassette 280 has been exposed to radiation, while a second circuit 340 serves as an indicator of whether a bottom portion 350 of the cassette has been exposed to radiation. As shown, the circuits 290 and 340 are respectively aligned with corresponding windows 320 and 360, to allow for visually-displayed output. However, in other embodiments, the exact configurations of the circuits 290 and 340 and their orientations and relationships with other portions of the cassette 280 need not be as shown in FIG. 6.

For example, FIGS. 7 and 8 show additional configurations of cassettes 280 on which multiple circuits 370 and 380, respectively, are employed. FIG. 7 in particular shows three circuits 370 positioned side-by-side along a midsection of the cassette, such that each of the circuits would be capable of detecting different radiation exposures occurring at three different column-type regions 375 of the cassette. Further, FIG. 8 shows nine circuits 380 that are positioned generally in a three-by-three matrix arrangement, such that those circuits would be respectively capable of detecting different radiation exposures at any of nine sections 285 of the cassette. Each of the circuits 370, 380 can be of any of the types of the circuits 150, 250, 270 and 290 of the previous FIGS. (or other circuits serving the same purposes as those circuits).

By employing multiple circuits such as the circuits 150, 250, 270, 290, 340, 370 and 380, it is possible not only to detect differently-timed radiation exposures of different portions of a cassette, but also possible to detect different magnitudes of radiation exposure (or even different types of radiation exposure, such as exposures to radiation of different wavelengths) occurring at different portions of the cassette. It is likewise possible to determine different times at which different magnitudes of radiation exposures have occurred, to detect accumulated amounts of radiation exposure that have occurred with respect to different sections of the cassette, and to determine other characteristics of interest.

Further, output signal(s) from the various circuits can be utilized in a variety of ways, both individually and in combination. For example, output signal(s) from two circuits corresponding to the radiation exposures that have occurred at two different sections of the cassette can be summed to obtain a total radiation exposure for the overall region including both of those sections. Also, for example, a radiation source 120 can vary its operation based upon the various signals from the various multiple circuits, e.g., when it is determined that two sections of a cassette have received uneven amounts of radiation exposure, the radiation source could vary the direction of the radiation 110 so that it impinges more directly one section of the cassette instead of another. Multiple radiation sources also could be controlled, respectively, based upon the output signals from the various respective circuits. For example, each respective circuit could operate as a distinct phototimer and provide signals to a respective radiation source that cause that source to modify or shut off after a certain amount of time and/or radiation exposure.

When different circuits are intended to detect radiation exposures associated with different sections of a cassette, it is not necessary that those sections be identical in size. Although only two circuits 290,340, three circuits 370 and nine circuits 380 are shown in FIGS. 6,7 and 8, respectively, it is also possible to have other numbers of such circuits associated with any given cassette. Also, it is not necessary for each of the circuits on a given cassette to be of the same type. For example, with respect to FIGS. 7 and 8, the circuits located at the centers of the cassettes shown in those respective FIGS. could of the same type as the circuit 150 of FIG. 3 while the others could be of the same type as the circuit 270 of FIG. 5.

It is specifically intended that the present invention not be limited to the embodiments and illustrations contained herein, but include modified forms of those embodiments including portions of the embodiments and combinations of elements of different embodiments as come within the scope of the following claims.

We claim:

1. A radiation exposure recording device comprising:
   a radiation exposure recording medium;
   a housing that at least partly surrounds the radiation exposure recording medium;
   a first detector that detects a first radiation exposure and produces at least one signal in response to detecting the first radiation exposure;
   a clock circuit providing a current time signal;
   a storage circuit communicating with the first detector and the clock circuit to store the current time signal at the time of the first radiation exposure; and
   a wireless transmitter receiving the stored current time from the storage circuit to transmit a wireless digital signal based upon the signal to a remote device.

2. The radiation exposure recording device of claim 1, wherein the radiation exposure recording medium is a radiation-sensitive film.

3. The radiation exposure recording device of claim 1, wherein the radiation exposure recording medium is a photostimulable plate.

4. The radiation exposure recording device of claim 1, wherein the wireless digital signal is communicated to a cassette reader.

5. The radiation exposure recording device of claim 1, further comprising a second detector, wherein the first detector detects a first radiation exposure with respect to a first portion of the radiation exposure recording device, and the second detector detects a second radiation exposure with respect to a second portion of the radiation exposure recording device.

6. The radiation exposure recording device of claim 1, wherein the detecting of the first radiation exposure includes determining that the first radiation exposure equaled or exceeded a first threshold.

7. The radiation exposure recording device of claim 1, wherein the detecting of the first radiation exposure includes determining an accumulated amount of radiation exposure.

8. The radiation exposure recording device of claim 1 wherein the clock circuit further with a time synchronization circiut, the time synchronization circuit communicating with a reference time source to verify the time of the clock circuit.

9. The radiation exposure recording device of claim 1 wherein the wireless transmitter is a radio transmitter.

10. A radiation exposure recording device comprising:
    a radiation exposure recording medium;
    a housing that at least partly surrounds the radiation exposure recording medium;
    a first detector that detects a first radiation exposure and produces at least one signal in response to detecting the first radiation exposure; a clock circuit providing a current time signal; a storage circuit communicating with the first detector and the clock circuit to store the current time signal at the time of the first radiation exposure;
    means for communicating the signal to a user including a wireless transmitter transmitting the signal as a wireless digital signal to a separate reader;
    wherein the first detector is located on an outer surface of the housing; and
    wherein the first detector is in the form of at least one of a sticker, a label and a card that is adhered to the surface of the housing.

11. The radiation exposure detection device of claim 10, wherein the radiation exposure recording medium is a radiation-sensitive film.

12. The radiation exposure detection device of claim 10, wherein the radiation exposure recording medium is a photostimulable plate.

13. The radiation exposure recording device of claim 10, further comprising a second detector, wherein the first detector detects the first radiation exposure with respect to a first portion of the radiation exposure recording device, and the second detector detects a second radiation exposure with respect to a second portion of the radiation exposure device.

* * * * *